No. 712,453.  
E. M. HEYLMAN.  
CORN PLANTER.  
(Application filed July 28, 1902.)  
Patented Oct. 28, 1902.
(No Model.)
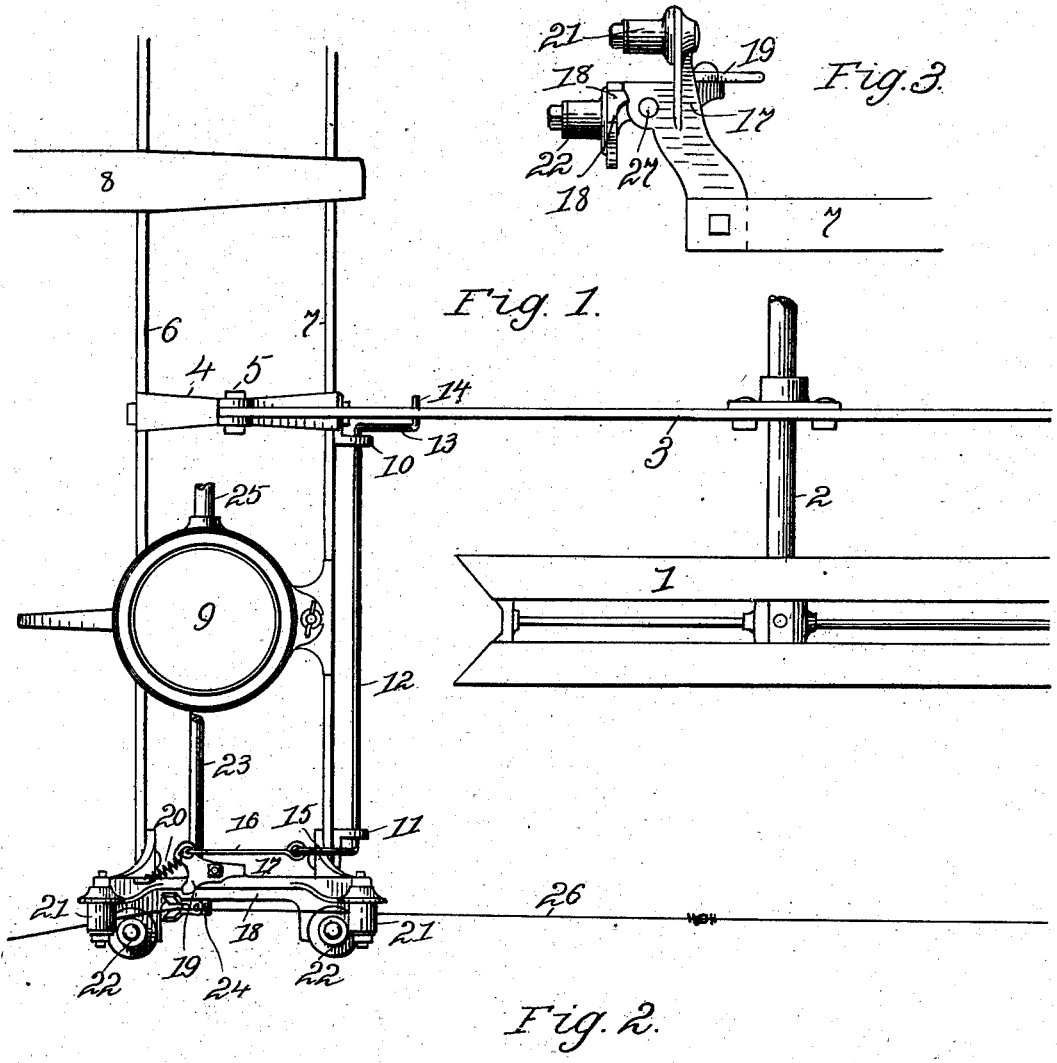
Fig. 3.
Fig. 1.
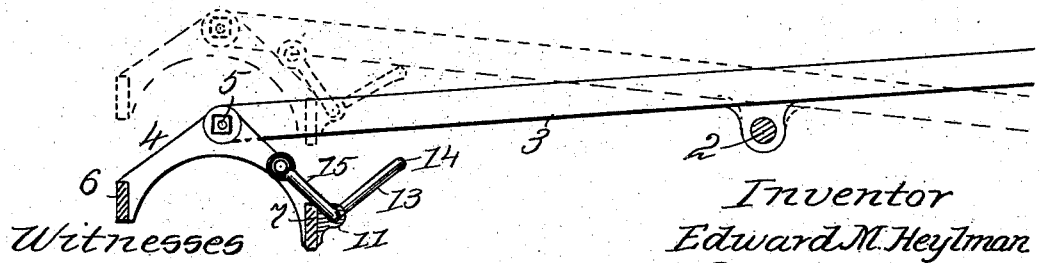
Fig. 2.
Witnesses  
Ina Graham  
Nora Graham
Inventor  
Edward M. Heylman  
by L. P. Graham  
his attorney.

UNITED STATES PATENT OFFICE.

EDWARD M. HEYLMAN, OF JANESVILLE, WISCONSIN, ASSIGNOR TO JANESVILLE MACHINE COMPANY, OF JANESVILLE, WISCONSIN, A CORPORATION OF WISCONSIN.

CORN-PLANTER.

SPECIFICATION forming part of Letters Patent No. 712,453, dated October 28, 1902.

Application filed July 28, 1902. Serial No. 117,405. (No model.)

*To all whom it may concern:*

Be it known that I, EDWARD M. HEYLMAN, of the city of Janesville, county of Rock, and State of Wisconsin, have invented certain new and useful Improvements in Corn-Planters, of which the following is a specification.

This invention relates to planters in which the dropping mechanism is actuated or controlled by means of a knotted wire which runs through guide-pulleys in the check-row heads of the planter; and the object is to provide means for releasing the wire from the planter by the act of raising the front frame to get the furrow-openers clear of the soil.

The invention is exemplified in the structure hereinafter described, and it is defined in the appended claims.

Corn-planters are made with two frames, a rear wheel-frame on which the driver sits and a front frame which is provided with furrow-openers and seed-dropping mechanism. The front end of the rear frame is hinged to the front frame, and in raising and lowering the front frame the rear frame rocks with the axle-shaft for a pivot and changes its relation to the horizontal. The front frame rises and falls without materially changing its relation to the horizontal, and so the angle formed between the two frames changes as the front frame rises and falls.

It is common to provide planters with check-row heads having guide-pulleys for the wire, and the heads are each made in two parts hinged together and secured in an operative position by means of a releasable catch. The swingable part of the head is pivoted outside the fixed part. The pivots are below the guide-pulleys of the head, and they extend lengthwise of the head and parallel to the line of travel of the planter. The wire pulls outward on the guide-pulleys of the check-row head, particularly as an end of the field is neared. The pull tends to separate the two parts of the head, and whenever the catch that secures the two parts together is released the wire at once tilts the swingable part outward and detaches itself from the planter. Heretofore it has been customary to release the catch by pulling on a line extending from the catch to near the seat of the driver; but this requires an operation separate from the raising of the front frame of the planter. The furrow-openers must be raised and the check-row wire must be thrown off before starting to turn the planter around, and the present invention provides means for performing the two operations simultaneously.

In the drawings forming part of this specification, Figure 1 is a plan of so much of a planter as is needed to explain my invention. Fig. 2 is a diagram in side elevation, showing how motion is obtained from the rise of the front frame to release the catch that holds the two parts of the check-row head together. Fig. 3 is an end view of a check-row head, showing the swingable part released and swung outward to throw off the wire.

A covering-wheel is shown at 1, and a part of the axle-shaft is shown at 2. A side bar of the rear frame of the planter is shown at 3. A bracket 4 is secured to the cross-bars 6 and 7 of the front frame of the planter, and the bar 3 of the rear frame is connected pivotally with the bracket at 5. The tongue 8 is secured to the front frame, and it holds such frame against material horizontal change during its rise and fall. A seedbox is shown at 9. Brackets 10 and 11 are secured to the rear cross-bar 7 of the front frame, and they project rearward therefrom. A rod 12 has rocking bearings in brackets 10 and 11, and its ends 13 and 15 are cranked, one upward and backward and the other upward and forward. A bend 14 is formed on the termination of crank 13, and such bend extends beneath bar 3. The fixed part 17 of the check-row head is attached to cross-bars 6 and 7, and the part 18 is pivotally connected with the fixed part, as shown at 27 in Fig. 3. The two parts of the check-row head are held together by a releasable catch 19. A spring 20 tends to hold the catch in an engaging position, and a link 16 connects a swinging end of the catch with the cranked arm 15 of rod 12. The pulleys for the fixed part of the head are shown at 21. The pulleys for the swingable part of the head are shown at 22. A check-row shaft 23 has a forked lever 24, through which wire 26 runs, and the forked lever is hinged to swing with the swingable part of the check-row head when the wire is thrown off. A drill-shaft is shown at 25. The rod 12 is somewhat elastic;

but its torsional strength is sufficient to transmit force from crank 13 to crank 15 and pull the catch 19 from engagement with the part 18 of the check-row head. So long as the furrow-formers are in the soil the end 14 of crank 13 is out of contact with frame-bar 3, as shown in solid lines in Fig. 2; but as the front frame approaches its highest position the crank-arm 13 engages bar 3 and the completion of the rise of the planter depresses crank 13, pulls backward on crank 15, and forces the catch 19 from engagement with part 18 of the check-row head. (See broken lines in Fig. 2.) If the upward motion of the front frame should be greater than is required to release the catch, the torsional elasticity of rod 12 will avoid breakage or detrimental strain of the parts. As soon as the front frame is lowered the spring 20 will swing catch 19 into position to engage part 18 of the check-row head, when such part is returned to its operative position.

I claim—

1. In a planter, the combination of a front frame carrying planting mechanism, a frame supported on wheels and hinged at its front end to the front frame, a tiltable wire-guide on the front frame, a catch to hold the tiltable wire-guide in operative position and a releasing appliance for the catch mounted on the front frame and actuated by the swing of the rear frame.

2. In a planter, the combination of a front frame carrying planting mechanism, a frame supported on wheels and hinged at its front end to the front frame, a tiltable wire-guide on the front frame, a catch to hold the tiltable wire-guide in operative position, a rock-shaft journaled in the front frame, an arm of the rock-shaft extended under a bar of the rear frame in the rear of the hinged conjunction of the frames, and a connection between the rock-shaft and the catch, whereby the catch is released by pressure derived from the rear frame as the front frame is raised.

3. In a planter, the combination of a front frame carrying planting mechanism, a frame supported on wheels and hinged at its front end to the front frame, a tiltable wire-guide on the front frame, a catch to hold the tiltable wire-guide in operative position, a rock-shaft journaled in the front frame, an arm on the rock-shaft extended under a bar of the rear frame in the rear of the hinged conjunction of the frames, a second arm on the rock-shaft, and a connection between the second arm and the catch for the tiltable wire-guide.

4. In a planter, the combination of a front frame carrying planting mechanism, a frame supported on wheels and hinged at its front end to the front frame, a tiltable wire-guide on the front frame, a catch to hold the tiltable wire-guide in operative position, an elastic rod journaled in the front frame and having one end cranked upward and rearward while the other end is cranked upward and forward, a bar of the rear frame extending above the rearward extension of the rod, and a link connecting the forward extension of the rod with the catch for the tiltable wire-guide.

In testimony whereof I sign my name in the presence of two subscribing witnesses.

EDWARD M. HEYLMAN.

Witnesses:
F. H. FARNSWORTH,
R. C. PURCELL.